United States Patent [19]

Moses

[11] Patent Number: 5,378,554
[45] Date of Patent: Jan. 3, 1995

[54] BATTERY CONTROL BOX

[76] Inventor: Donald W. Moses, 448 S. Wheeling, Kansas City, Mo. 64123

[21] Appl. No.: 65,396

[22] Filed: May 24, 1993

[51] Int. Cl.6 .................................................. H01M 002/10
[52] U.S. Cl. ...................................... 429/97; 429/91; 429/121; 320/2
[58] Field of Search ......................... 429/96–100, 429/90, 91, 121, 122, 7, 6, 163, 175, 176, 185; 439/500, 504; 320/2, 48; 307/150

[56] References Cited

U.S. PATENT DOCUMENTS

| | | | |
|---|---|---|---|
| 1,337,160 | 4/1920 | Riebeth | 429/90 X |
| 3,185,921 | 5/1965 | Sumter | 429/93 X |
| 3,950,688 | 4/1976 | Sancey et al. | 320/2 |
| 3,963,972 | 6/1976 | Todd | 320/2 |
| 4,224,383 | 9/1980 | Taylor | 429/7 |
| 4,435,486 | 3/1984 | Pomaro et al. | 429/121 X |
| 4,983,473 | 1/1991 | Smith | 429/121 X |

Primary Examiner—Anthony Skapars
Attorney, Agent, or Firm—E. Michael Combs

[57] ABSTRACT

A housing is arranged to mount a battery therewithin to effect selective and continuous recharging of the battery in a sealed manner. To this end, external contacts are arranged for communication with the battery maintaining the battery in a sealed orientation within the housing during a charging procedure. The organization is arranged to further include a volt meter and optional accessories as desired.

1 Claim, 4 Drawing Sheets

BATTERY CONTROL BOX

BACKGROUND OF THE INVENTION

1. Field of the Invention

The field of invention relates to battery box structure, and more particularly pertains to a new and improved battery control box wherein the same is arranged to permit the recharging and external access to a battery contained within the box structure.

2. Description of the Prior Art

Battery box and container structure is indicated in the prior art such as U.S. Pat. Nos. 3,791,874; 4,063,007; and 4,494,420.

The instant invention attempts to overcome deficiencies of the prior art by providing for a hermetically sealed battery structure permitting selective charging and access to voltage of the battery contained within the housing structure and in this respect, the present invention substantially fulfills this need.

SUMMARY OF THE INVENTION

In view of the foregoing disadvantages inherent in the known types of battery box structure now present in the prior art, the present invention provides a battery control box wherein the same is arranged for the positioning of a battery within a battery box member for selective use of the battery in a sealed, stored orientation. As such, the general purpose of the present invention, which will be described subsequently in greater detail, is to provide a new and improved battery control box which has all the advantages of the prior art battery box structure and none of the disadvantages.

To attain this, the present invention provides a housing arranged to mount a battery therewithin to effect selective and continuous recharging of the battery in a sealed manner. To this end, external contacts are arranged for communication with the battery maintaining the battery in a sealed orientation within he housing during a charging procedure. The organization is arranged to further include a volt meter and optional accessories as desired.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved battery control box which has all the advantages of the prior art battery box structure and none of the disadvantages.

It is another object of the present invention to provide a new and improved battery control box which may be easily and efficiently manufactured and marketed.

It is a further object of the present invention to provide a new and improved battery control box which is of a durable and reliable construction.

An even further object of the present invention is to provide a new and improved battery control box which is susceptible of a low cost of manufacture with regard to both materials and labor, and which accordingly is then susceptible of low prices of sale to the consuming public, thereby making such battery control boxes economically available to the buying public.

Still yet another object of the present invention is to provide a new and improved battery control box which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularly in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
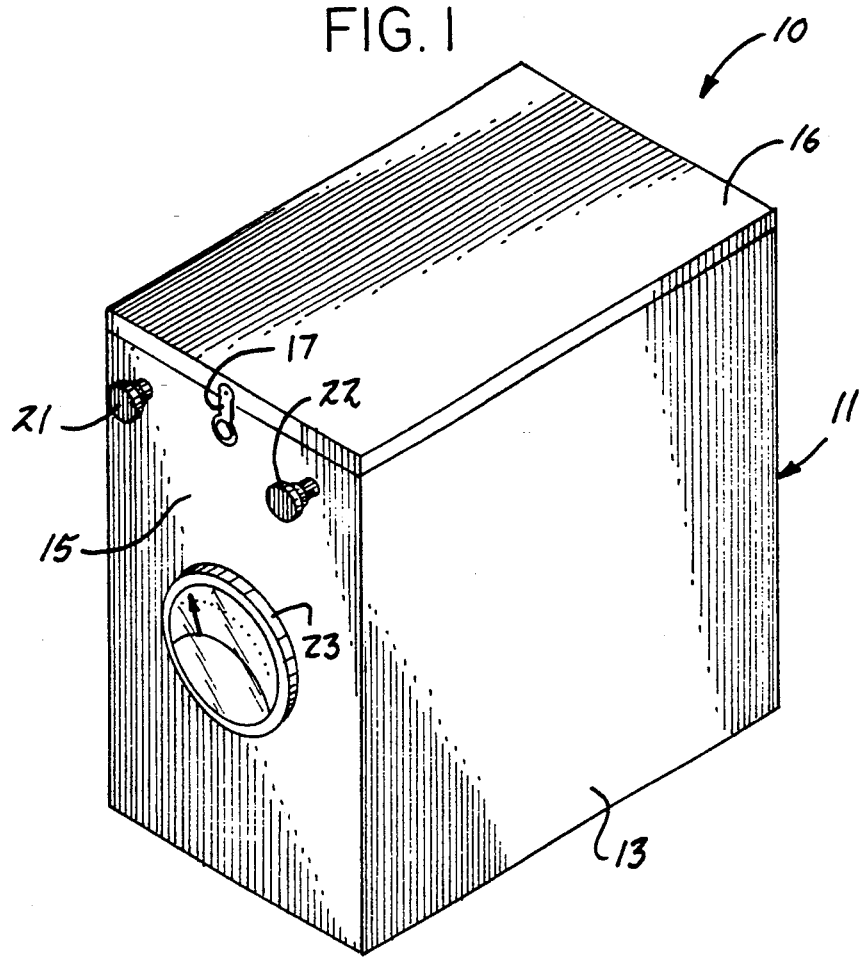
FIG. 1 is an isometric illustration of the invention.
Figure 2:
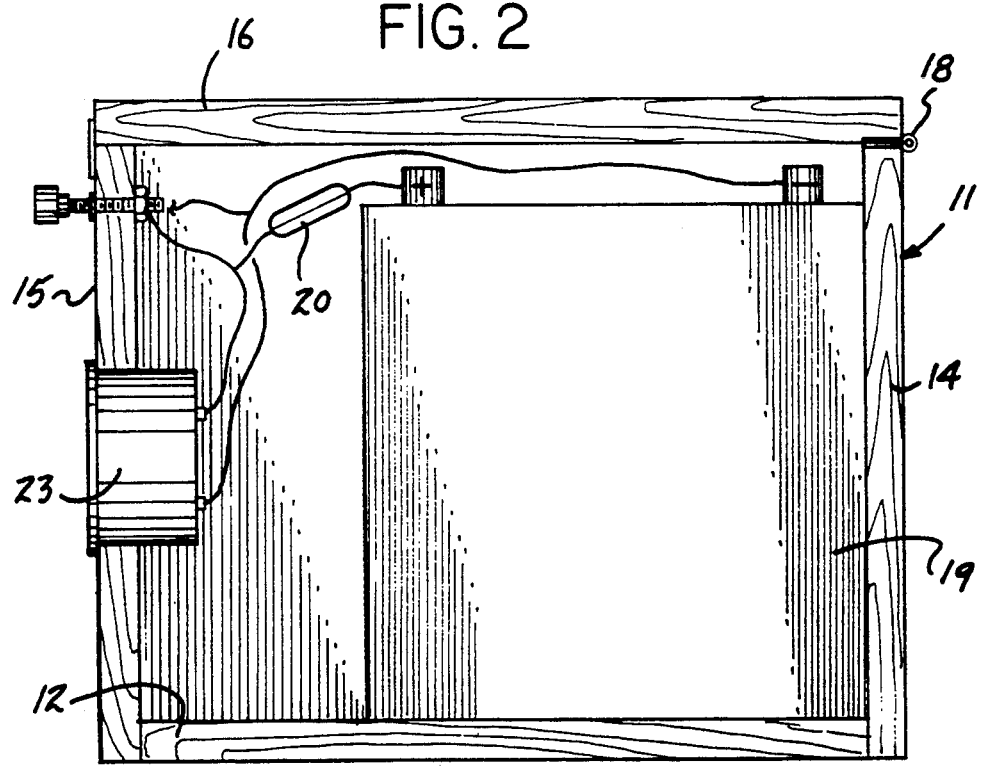
FIG. 2 is a cross-sectional illustration of the battery box structure.
Figure 3:
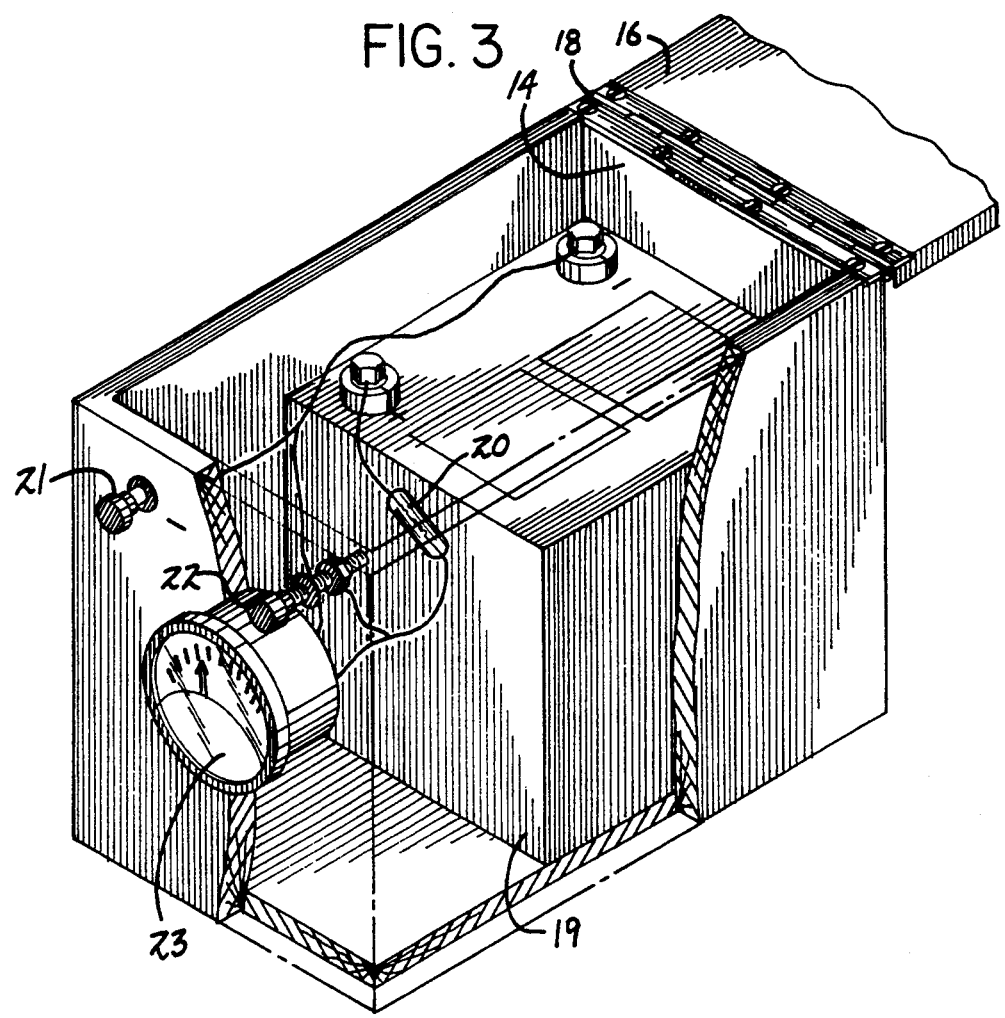
FIG. 3 is an isometric illustration of the invention, partially in section, indicating a lid in open orientation relative to the housing structure.
Figure 4:
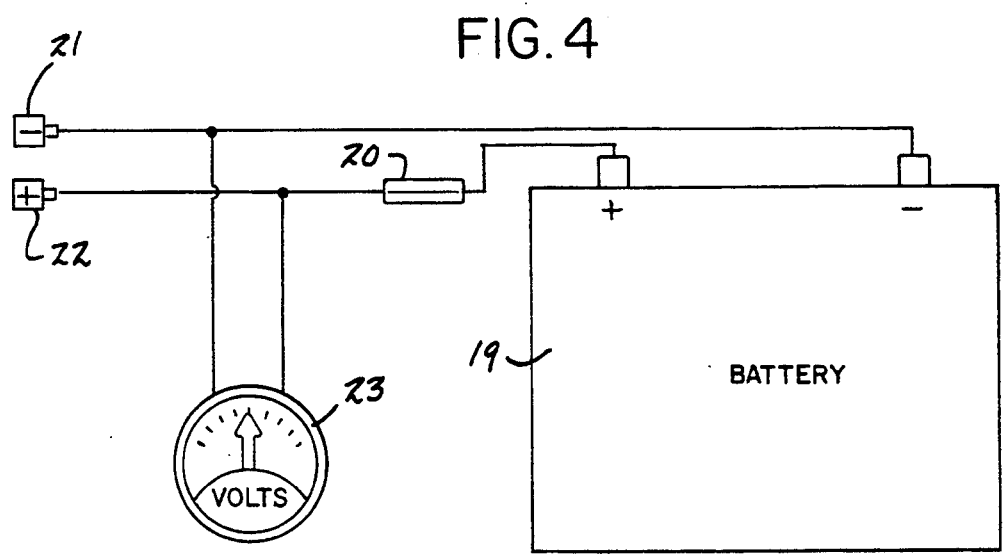
FIG. 4 is a diagrammatic electrical illustration of the circuitry of the invention.
Figure 5:
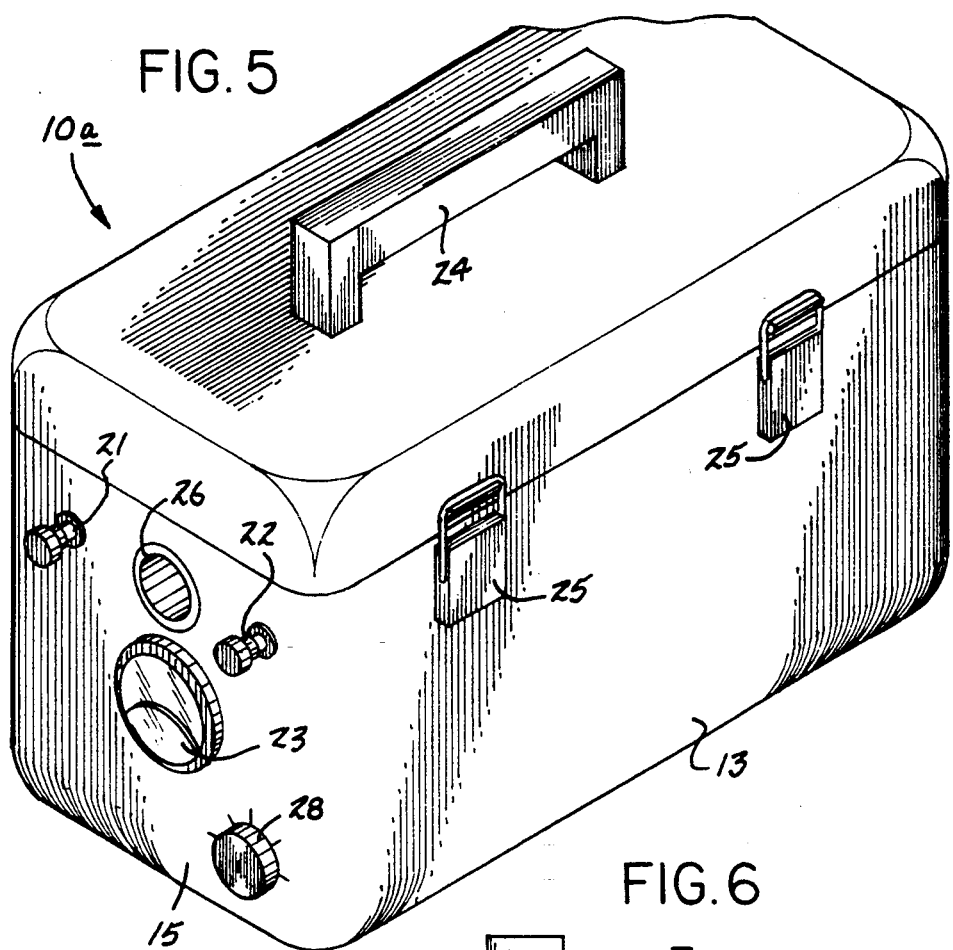
FIG. 5 is an isometric illustration of a modified aspect of the invention.
Figure 6:
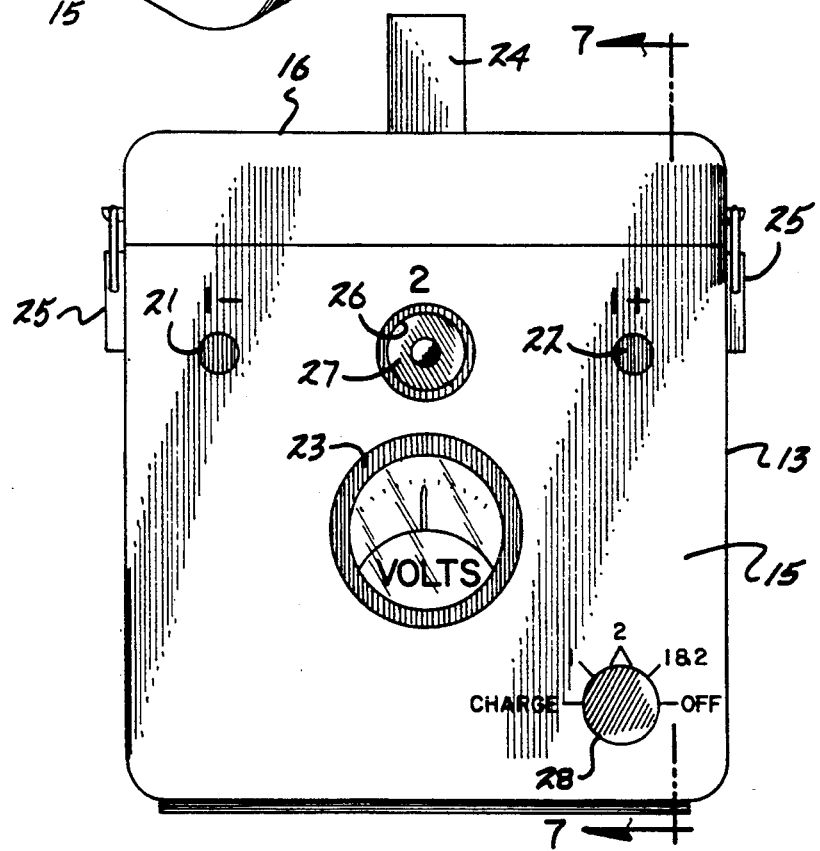
FIG. 6 is an orthographic frontal view of the invention.

With reference now to the drawings, and in particular to FIGS. 1 to 8 thereof, a new and improved battery control box embodying the principles and concepts of the present invention and generally designated by the reference numerals 10 and 10a will be described.

More specifically, the battery control box 10 of the instant invention essentially comprises a housing 11 having a floor 12, spaced side walls 13, a rear wall 14, a front wall 15, and a lid 16 hingedly mounted relative to the rear wall 14 about a hinge 18, with a latch 17 arranged for securement of the lid to the housing structure, as illustrated in FIG. 1. A battery 19 is mounted upon the floor 12, with a fuse 20 directed between a positive battery post and the terminal 22 relative to a first terminal 21, wherein the first and second terminals 21 and 22 are directed through the front wall 15 in electrical communication with the positive and negative terminals respectively of the battery 19 through a volt meter 23 directed through the front wall to indicate available electrical energy within the battery structure. The fuse 20 may be of any desired amperage such as one amp and the like.

The FIGS. 5-8 indicates the use of a modified battery control box 10a. A handle 24 is mounted to the lid, wherein the lid includes a plurality of latch members 25 mounting the lid to the side walls, with a cigarette lighter socket 26 directed into the front wall receiving a cigarette lighter tube 27 to provide for a selective accessory relative to the battery structure in use. A multi-position switch 28 is in operative communication with the cigarette lighter structure, as well as the battery 19 and a battery charger unit operative as an AC/DC converter to effect selective recharging of the battery 19 through the switch 28, wherein the switch permits selective charging of the battery, access to the negative and positive terminals of the first and second terminals 21 and 22 respectively and the cigarette lighter structure, as well as having an off position.

Figure 7:
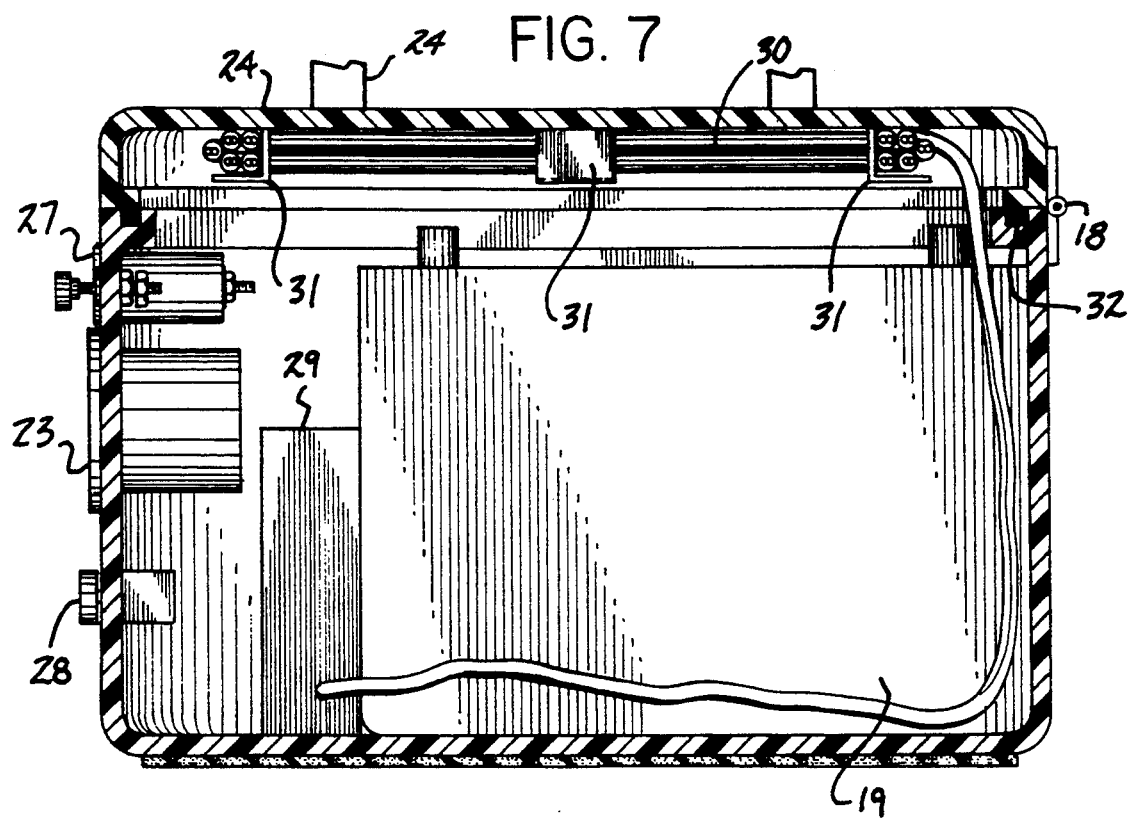
FIG. 7 is an orthographic view, taken along the lines 7—7 of FIG. 6 in the direction indicated by the arrows.
Figure 8:
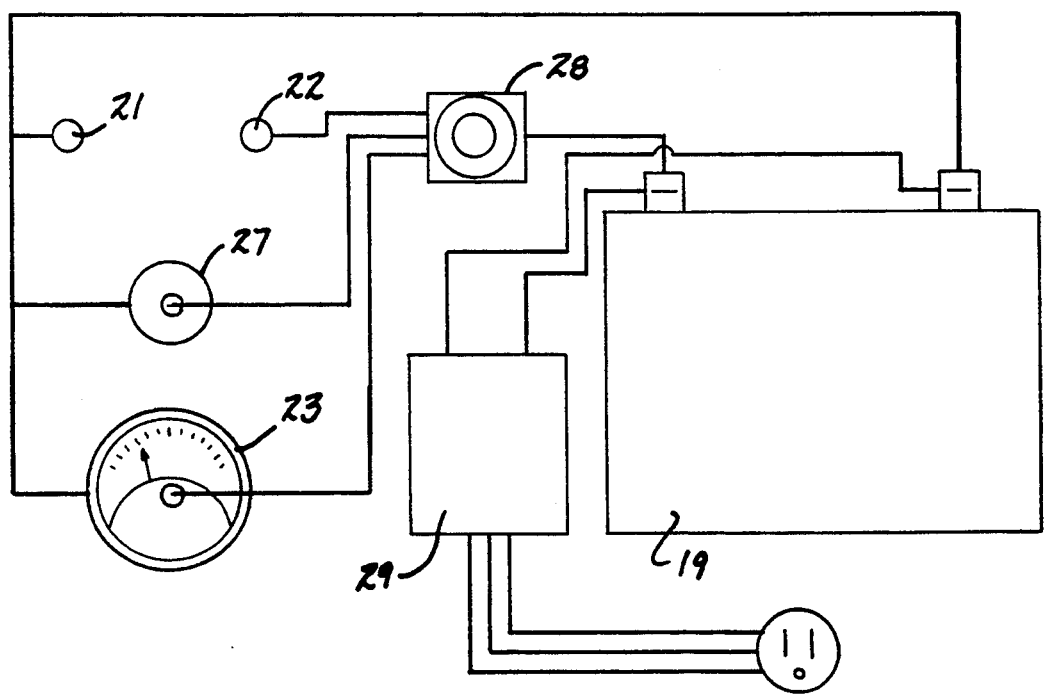
FIG. 8 is a diagrammatic electrical illustration of the control circuitry relative to the invention, as indicated in FIG. 5.

Reference to FIG. 7 indicates that a plurality of L-shaped flanges 31 are mounted to the lid 16 within the housing in facing relationship relative to the battery such that a battery charger electrical supply cable 30 is wound about the L-shaped flanges 31 permitting unwinding of the electrical supply cable 30 for recharging of the battery through the charger unit 29. Further, a continuous resilient sealing ring 32 is in a confronting relationship relative to the lid 16 from the wall structure 13, 14, and 15 of the housing 11 to provide for hermetic sealing of the container and the battery structure for permitting use of the organization relative to marine applications.

As to the manner of usage and operation of the instant invention, the same should be apparent from the above disclosure, and accordingly no further discussion relative to the manner to usage and operation of the instant shall be provided.

With respect to the above description then, it is to be realized that the optimum dimensional relationships for the parts of the invention, to include variations in size, materials, shape, form, function and manner to operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A battery control box, comprising, a housing, the housing having a floor, spaced side walls, a rear wall, a front wall, and a lid, the lid having a hinge pivotally mounting the lid to the rear wall, with the lid including at least one latch permitting selective fixed engagement of the lid relative to the housing structure, with a battery mounted to the floor, and a first terminal and a second terminal directed through the front wall, with the battery having a first battery post and a second battery post, the first battery post in electrical communication with the first terminal, and the second battery post in electrical communication with the second terminal, and a volt meter directed through the front wall in operative communication with the first terminal and the second terminal for indication of electrical voltage availability of the battery, and a cigarette lighter member directed through the front wall in electrical communication with the battery, and a multi-position switch, with the multi-position switch permitting selective electrical communication of the battery and volt meter to the first terminal, second terminal, and the cigarette lighter, and including a battery charger unit mounted to the floor, having an electrical supply cable in electrical communication with the battery through the battery charger unit, and a plurality of L-shaped flanges mounted to the lid within the housing, with the electrical supply cable wound about the L-shaped flanges during storage of the electrical supply cable, and a continuous resilient sealing ring mounted to the side walls, rear wall, and front wall for contiguous communication with the lid, when the lid is in contiguous communication with the front wall.

* * * * *